United States Patent Office 2,784,199
Patented Mar. 5, 1957

2,784,199

ENDOXY ISOINDOLINE DERIVATIVES AND SALTS THEREOF

Charles H. Grogan, Falls Church, Va., and Leonard M. Rice, Baltimore, Md., assignors to The Geschickter Fund for Medical Research, Inc., Washington, D. C., a corporation of New York No Drawing. Application December 13, 1954, Serial No. 475,015

14 Claims. (Cl. 260—319)

This invention relates to compositions of matter, particularly to chemotherapeutic organic compounds and methods of their preparation, and more particularly to compounds applicable to the treatment of hypertension.

Specifically the invention involves the discovery and preparation of a novel class of compounds, hereinafter referred to as endoxy-isoindoline derivatives, obtained by preparing N-substituted endoxy and ring and N-substituted endoxy-isoindoline derivatives in which the isoindoline ring is completely hydrogenated and conversion of the heterocyclic bases thus obtained to simple salts, quaternary salts and bis-quaternary salts. The bis-quaternary salts have been proven to be very effective and superior to known remedies in the treatment of hypertension.

Accordingly, it is a basic object of the present invention ot provide novel organic compounds and methods for the preparation thereof.

Another object is to provide novel compounds characterized by chemotherapeutic or medicinal properties and particularly by the ability to induce a marked hypotensive effect, i. e., to relieve hypertension.

A more specific object is to provide novel compounds, namely, endoxy-isoindoline derivatives including the heterocyclic bases, simple, quaternary and bis-quaternary salts thereof.

Another and equally important object of the invention is the provision of methods of synthesizing the novel compounds referred to in the foregoing objects.

These and other objects and the manner in which they are accomplished will become apparent to those conversant with the art from the following description of the general class of novel compounds and contain specific examples of particular members thereof as well as general and specific methods of their synthesis.

Generally stated, the novel products discovered are obtained by preparing N-substituted dialkylaminoalkyl endoxy isoindoline derivatives and ring substituted N-dialkylaminoalkyl endoxy isoindoline derivatives, in which the isoindole ring is completely hydrogenated and conversion of the heterocyclic bases thus obtained to hydrochloride, hydrobromide, hydroiodide, sulphate and acetate salts, mono quaternary salts and bis-quaternary salts. The imides from which the heterocyclic bases are derived may be represented by the following formula showing 3,6 endoxyhexahydrophthalimides:

(1)

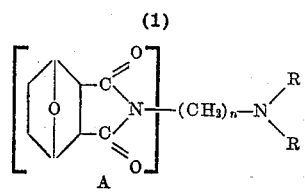

In Formula 1, R represents an alkyl radical containing from 1 to 6 carbon atoms and "$n$" is a number from 2 to 6 or the part

of Formula 1 may represent a heterocyclic base namely, piperidine, morpholine or pyrrolidine.

Referring to Formula 1, and keeping the same meanings for R and $n$, the basic ring structure enclosed in brackets and designated A represents an endoxy phthalimide residue in a completely hydrogenated state or various ring substituted endoxy phthalimide residues, for example, 3-methyl-3,6-endoxyphthalimide; 3,6 - dimethyl-3,6-endoxyphthalimide; 1,2-dimethyl-3,6 - endoxyphthalimide; or 3,4,5,6-tetramethyl 3,6-endoxyphthalimide.

The imides used in preparing the physiologically active heterocyclic bases discovered may be prepared by reacting the desired dialkylaminoalkylamine or heterocyclicalkylamine with the desired acid anhydride in equimolecular quantities. The amic acids thus formed are cyclized to the corresponding imides with elimination of water by heating at the appropriate temperature for 2–5 hours, the necessary temperature to effect the ring closure of the amic acids being generally in the range 160–180° C.

The resulting dialkylaminoalkyl or heterocyclicalkyl imides may then be reduced to the corresponding heterocyclic nitrogen base by means of lithium aluminum hydride or metallic sodium in alcohol, catalytically or electrolytically. All imides prepared and studied in the several series derived from the anhydrides mentioned are reduced, in good to excellent yields, to the desired bases by lithium aluminum hydride.

Representative bases obtained by reduction of the appropriate imides are shown in Formula 2, (2)

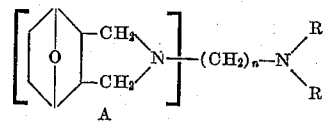

wherein the notations A, R, and $n$ have the same meaning as described in connection with Formula 1. All N-substituted endoxy hydrogenated isoindolines thus formed may be readily converted to simple salts, quaternary salts or bis-quaternary salts. The dialkylaminoalkyl and hetrocyclicalkyl imides illustrated by Formula 1 may also be converted to simple salts and quaternary salts. The types of salt formation and quaternary salt formation which have been utilized with the imides and bases disclosed herein are illustrated by Formula 3, 4, 5a, and 5b which follow:

(3)

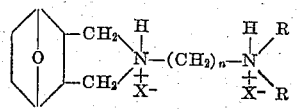

Formula 3 represents simple salts of the reduced imides in which $X^-$ is an anion namely chloride, bromide, iodide, acetate:

(4)

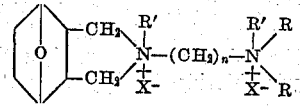

Formula 4 represents a bis-quaternary salt of the type shown in Formula 2.

(5a) (5b)

Formulas 5a and 5b show simple and quaternary salts, respectively, of imides of the type shown by Formula 1, in the Formulas 4 and 5b, R has the same meaning as in Formula 1 and $R^1$ represents an alkyl group containing 1 to 10 carbon atoms and may be the same as or different from R.

It will be understood that a wide variety of heterocyclic bases, salts and quaternary salts thereof may be prepared by the processes described. The imides disclosed herein are important intermediates in the synthesis of the bases, and the simple salts and quaternary salts of the bases. The quaternary salts are especially valuable as chemotherapeutic agents, having been found to be very effective and superior to presently known remedies in the treatment of hypertension.

The following examples of synthesizing procedures and chemical and physical characterization of some of the substances which are the subject of this invention will illustrate the process employed and the materials resulting therefrom. It will be understood, however, that these examples are not intended to be exhaustive nor to cover all compounds prepared or which may be prepared according to the discovery.

EXAMPLE I

*N-dimethylaminomethylhexahydro - 4,7 - endoxyisoindoline base, hydrochloride and bis-methonium diiodide*

A. IMIDE 88.2 grams (1 mole) of dimethylaminomethyl amine was added in one lot to 168.2 grams (1.0 mole) of 3,6-endoxyhexahydrophthalic anhydride and the mixture stirred and warmed until a homogeneous viscous mass is obtained with all anhydride in solution. This results in a mixture of the amic acid and the imide The amic acid and the imide are not separated but the mixture is then heated to 170° C. in an oil bath for a period of 4 hours to complete cyclization of the amic acid to the imide. The resulting imide was then vacuum-distilled and the imide obtained, appearing as a colorless oil having a boiling point of 140–145° C. at 0.5 mm. pressure. With the proportions of reagents stated, the yield of imide was 210 grams.

B. IMIDE HYDROCHLORIDE 10 grams of the imide so obtained was dissolved in 50 ml. of absolute methanol and an excess of an absolute ethanol saturated solution of HCl added, followed by dry ether. The mixture, upon refrigeration yielded a crystalline hydrochloride having a melting point of 244–245° C.

C. BASE 110 grams of the imide (A, above) was added dropwise to 36 grams of lithium aluminum hydride dissolved in 1 liter of anhydrous ether so as to just maintain reflux of the ether. The whole of the imide was added to the vigorously stirred mixture over a period of 2 hours, the mixture stirred four hours longer and then decomposed by the minimum amount of cold water. When gas was no longer evolved, a slight excess of water was added and the mixture stirred over night. Inorganic salts were filtered off and the ethereal filtrate dried over anhydrous sodium sulfate and upon vacuum-distillation yielded 90 grams, having a boiling point 98–101° C. at 0.6 mm. pressure. The product had the formula

D. DIHYDROCHLORIDE 10 grams of the base (C, above) is dissolved in 50 ml. of anhydrous methanol. Addition of dry ether and refrigeration produces the dihydrochloride, which has a melting point of 265–67° C.

DIMETHIODIDE 10 grams of the base (C, above) dissolved in 50 ml. of anhydrous methanol and treated with a 10% excess of methyl iodide yields, on addition of dry ether and refrigeration, the dimethiodide, melting point 231–233° C. The product had the formula

EXAMPLE II

*N-diethylaminoethylhexahydro - 4,7 - endoxyisoindoline base, hydrochloride and bis-methonium iodide*

The diethylaminoethyl derivatives were prepared by procedures exactly analogous to types of Example I. The imide has a boiling point of 145 to 150° C. at 2 mm. pressure; the isoindoline derivative, a boiling point of 130–135° C. at 2 mm.; and the dimethiodide a melting point of 234–235° C.

The imides prepared and their respective boiling points are tabulated below:

| Imide: | Boiling point/pressure |
|---|---|
| Dimethylaminopropyl | 138–142° C./2 mm. |
| Diethylaminopropyl | 158–165° C./2 mm. |
| Dibutylaminopropyl | 125–130° C./0.1 mm. |
| Dihexylaminoethyl | 158–164° C./0.1 mm. |
| Diethylaminohexyl | 124–133° C./0.1 mm. |
| Morpholinoethyl | 175–180° C./5 mm. |
| Morpholinopropyl | 175–185° C./0.2 mm. |
| Piperidinoethyl | 170–175° C./0.1 mm. |

Selected members of the tabulated imides were reduced and salts and quaternary salts prepared.

EXAMPLE III

*N-dimethylaminoethyl - 4,7 - dimethyl - 4,7 - endoxyperhydroisoindoline*

Also in a manner analogous to Example I, the dimethylaminoethyl imide of 3,6 - dimethyl - 3,6 - endoxytetrahydrophthalic anhydride (boiling point 130–135° C./0.05 mm.) and imide hydrochloride (melting point 249–251° C.) were prepared. The actual percentage of chloride ion ($Cl^-$) in the hydrochloride was found to be 11.78 as compared with 11.70% indicated by theoretical calculations.

Lithium aluminum hydride reduction of this imide yielded a base which boiled at 94° C. at 0.2 mm. Dihydrochloride of the base has a melting point of 249–250° C. and a chloride ion concentration of 22.87 as compared to the theoretical of 22.78% and dimethiodide of the base had melting point of 258–260° C., a theoretical iodide content of 48.61% and an actual iodide content of 48.30%.

EXAMPLE IV

*N-dimethylaminoethyl-4-methyl-4,7-endoxyperhydroisoindoline, base, dihydrochloride and dimethiodide*

In a manner analogous to the procedures given under Example I, the imide of dimethylaminoethylamine and 3-methyl-3,6-endoxy-cis-pentahydrophthalic anhydride (boiling point 124–134° C./0.2 mm.) were prepared, as were the imide hydrochloride (melting point 260° C.); by reduction of the imide, the isoindoline base (boiling point 100–105° C./0.2 mm.); the dihydrochloride of the base (melting point 237° C.); and the dimethiodide of the base (melting point 233° C.).

EXAMPLE V

*N-dimethylaminoethyl-8,9-dimethyl-4,7-endoxyperhydroisoindoline, base, dihydrochloride and dimethiodide*

By means of the same general procedure described in Example I, above, the imide of dimethylaminoethylamine and 1,2-dimethyl-3,6-endoxy cis-tetrahydrophthalic anhydride (Cantharidin) was prepared and found to have a melting point of 77° C. and boiling point of 135–145° C./ at 0.4 mm. pressure. Also prepared were the imide hydrochloride having melting point of 276–277° C.; the base, obtained by reduction of the imide, having boiling point of 112–114° C./ at 0.3 mm. pressure; and the dihydrochloride and the dimethiodide of the base, which melted at 264–265° C. and 206–208° C., respectively.

These compounds and particularly the quaternary salts have been found to be very effective in the treatment of hypertension. An effective dosage for this purpose is 250 to 300 milligrams daily administered orally or 50 to 100 milligrams given by injection.

From the foregoing description of a novel class of compounds, particular exemplary members of the class and methods of synthesizing same, it will be understood that, on the basis of the discovery and knowledge disclosed, other specific compounds can be made and variations in the method of synthesis resorted to. Therefore, the specific compounds and method disclosed herein are to be considered in all respects illustrative and not restrictive, the scope of the discovery being indicated by the appended claims rather than the foregoing description, and all specific compounds and variations in method which come within the meaning and range of equivalency of the claims are therefore intended to be embraced therein.

This application is a continuation-in-part of our application Serial No. 387,316 filed October 20, 1953, now abandoned.

We claim:

1. A compound selected from the group consisting of (1) N-substituted endoxy perhydroisoindolines wherein the endoxy ring is selected from the group consisting of unsubstituted and methyl substituted rings, and wherein the N-substituent is selected from the group consisting of di-lower alkyl amino-lower alkylene groups, the morpholino-lower alkylene groups, the piperidino-lower alkylene groups, and the pyrrolidino-lower alkylene groups and (2) non-toxic acid addition and di-quaternary salts of (1).

2. A novel compound comprising a non-toxic dimethonium salt of N-dimethylaminoethyl-4-methyl-4,7-endoxyperhydroisoindoline.

3. A novel compound comprising a non-toxic dimethonium salt of N-dimethylaminoethyl-4,7-dimethyl-4,7-endoxyperhydroisoindoline.

4. A novel compound comprising a non-toxic dimethonium salt of N-dimethylaminoethyl-4,7-endoxyperhydroisoindoline.

5. A novel compound comprising a non-toxic dimethonium salt of N-dimethylaminopropyl-4-methyl-4,7-endoxyperhydroisoindoline.

6. A novel compound comprising a non-toxic dimethonium salt of N-dimethylaminopropyl-4,7-dimethyl-4,7-endoxyperhydroisoindoline.

7. The dimethonium chloride of N-dimethylaminoethyl-4-methyl-4,7-endoxyperhydroisoindoline.

8. The dimethonium chloride of N-dimethylaminoethyl-4,7-dimethyl-4,7-endoxyperhydroisoindoline.

9. A method of synthesizing endoxyisoindoline derivatives comprising reacting a suitable amine selected from the class consisting of simple di-lower alkyl amino-lower alkylene amines and hetercyclic-lower alkylene amines with the desired acid anhydride to obtain the amic acid, heating to cyclize the amic acid to the imide, reducing the imide to the substituted isoindoline and treating the isoindoline with a compound selected from the group consisting of acids and alkyl halides to obtain a salt of the substituted isoindoline.

10. A method of synthesizing endoxyisoindoline derivatives comprising reacting dimethylaminoethylamine and 3-methyl-3,6-endoxy-cis-pentahydrophthalic anhydride to obtain the amic acid, heating to cyclize the amic acid to the imide, reducing the imide to N-dimethylaminoethyl-4-methyl-4,7-endoxyperhydroisoindoline, and treating the isoindoline with a compound selected from the group consisting of acids and alkyl halides to obtain a non-toxic salt of the isoindoline.

11. A method of synthesizing endoxyisoindoline derivatives comprising reacting dimethylaminoethylamine and 3,6-dimethyl-3,6-endoxytetrahydrophthalic anhydride to obtain the amic acid, heating to cyclize the amic acid to the imide, reducing the imide to N-dimethylaminoethyl-4,7-dimethyl-4,7-endoxyperhydroisoindoline, and treating the isoindoline with a compound selected from the group consisting of acids and alkyl halides to obtain a non-toxic salt of the isoindoline.

12. A method of synthesizing endoxyisoindoline derivatives comprising reacting dimethylaminoethylamine and 3,6-endoxyhexahydrophthalic anhydride to obtain the amic acid, heating to cyclize the amic acid to the imide, reducing the imide to N-dimethylaminoethyl-4,7-endoxyperhydroisoindoline, and treating the isoindoline with a compound selected from the group consisting of acids and alkyl halides to obtain a non-toxic salt of the isoindoline.

13. A method of synthesizing endoxyisoindoline derivatives comprising reacting dimethylaminopropylamine and 3-methyl-3,6-endoxy-cis-pentahydrophthalic anhydride to obtain the amic acid, heating to cyclize the amic acid to the imide, reducing the imide to N-dimethylaminopropyl-4-methyl-4,7-endoxyperhydroisoindoline, and treating the isoindoline with a compound selected from the group consisting of acids and alkyl halides to obtain a non-toxic salt of the isoindoline.

14. A method of synthesizing endoxyisoindoline derivatives comprising reacting dimethylaminopropylamine and 3,6-dimethyl-3,6-endoxytetrahydrophthalic anhydride to obtain the amic acid, heating to cyclize the amic acid to the imide, reducing the imide to N-dimethylaminopropyl-4,7-dimethyl-4,7-endoxyperhydroisoindoline, and treating the isoindoline with a compound selected from the group consisting of acids and alkyl halides to obtain a non-toxic salt of the isoindoline.

References Cited in the file of this patent

UNITED STATES PATENTS

| | | |
|---|---|---|
| 2,524,136 | Prill | Oct. 3, 1950 |
| 2,524,145 | Tawney | Oct. 3, 1950 |

OTHER REFERENCES

Elderfield: Heterocyclic Compounds, vol. 3, p. 276–290, 1952.